(12) United States Patent
Roy

(10) Patent No.: US 10,777,089 B2
(45) Date of Patent: Sep. 15, 2020

(54) PREDICTION AND ALERT SYSTEM TO IDENTIFY HIGHER RISK STUDENTS WITH GRADING SYSTEM IN AN ONLINE LEARNING FORUM

(71) Applicant: Yellowdig, Philadelphia, PA (US)

(72) Inventor: Shaunak Roy, Haddonfield, NJ (US)

(73) Assignee: Yellowdig, Philadelphia, PA (US)

( * ) Notice: Subject to any disclaimer, the term of this patent is extended or adjusted under 35 U.S.C. 154(b) by 358 days.

(21) Appl. No.: 15/602,301

(22) Filed: May 23, 2017

(65) Prior Publication Data

US 2017/0337837 A1 Nov. 23, 2017

Related U.S. Application Data

(60) Provisional application No. 62/340,325, filed on May 23, 2016.

(51) Int. Cl.
*G09B 7/02* (2006.01)
*H04L 12/18* (2006.01)

(52) U.S. Cl.
CPC ............ *G09B 7/02* (2013.01); *H04L 12/1831* (2013.01)

(58) Field of Classification Search
CPC ... G09B 7/00; G09B 7/02; G09B 5/08; G06Q 50/20; G06Q 50/205
See application file for complete search history.

(56) References Cited

U.S. PATENT DOCUMENTS

| | | | |
|---|---|---|---|
| 2009/0172100 A1* | 7/2009 | Callanan ................. | G09B 7/02 709/205 |
| 2010/0162135 A1* | 6/2010 | Wanas .................... | G06Q 10/10 715/753 |
| 2013/0260354 A1* | 10/2013 | Kutty ...................... | G09B 5/00 434/350 |
| 2014/0349272 A1* | 11/2014 | Kutty ...................... | G09B 5/08 434/362 |
| 2015/0099255 A1* | 4/2015 | Aslan ..................... | G06Q 50/01 434/350 |
| 2016/0225275 A1* | 8/2016 | Wood ................... | G06Q 10/101 |

* cited by examiner

*Primary Examiner* — Jerry-Daryl Fletcher
(74) *Attorney, Agent, or Firm* — Schott, P.C.

(57) ABSTRACT

A system for use in preparing student grades based on participation in an online teaching forum includes an online forum usable by students where students interact within the forum by adding content to the forum, an analytics module that analyzes the added content and assigns the content a point value based on the content quality, and a grading module that calculates a grade for each student based on the point value.

13 Claims, 17 Drawing Sheets

351 — DEV TEAM ACTIVITIES  NETWORK▼ HELP▼ | DEV TEAM ACTIVITIES | ▼ | [3] SHAUNAK S ⊗ ▼

350 — [≈ FEED | □ COMMUNITY | □ FILES | □ DASHBOARD | □ SETTINGS | □ ADMIN]
         352              354            356              358          359

COURSE REPORT FOR DEV TEAM ACTIVITIES

🔍 SEARCH BOARD MEMBERS

510

| FOLLOWER | POINTS | PINS | COMMENTS | VOTES |
|---|---|---|---|---|
| LISA M | 1 | 0 | 1 | 3 |
| ALEXANDRE L | 1 | 0 | 1 | 2 |
| SHAUNAK R | 2 | 1 | 2 | 2 |
| ANAND A | 0 | 0 | 0 | 0 |
| ALEXANDER G | 0 | 0 | 0 | 0 |
| KYLE F | 1 | 1 | 1 | 2 |
| MATT C | 0 | 0 | 0 | 5 |
| KHASHYNA O | | | | |

[ABOUT]   ⑦ HELP

FIG. 5A

LIST OF "AT RISK" STUDENTS FOR EARLY INTERVENTION

| | STUDENT NAME | ENGAGEMENT SCORE | | REASON FOR TRIGGER |
|---|---|---|---|---|
| | JOHN S | 5% | ⬇ | 2 WEEKS WITHOUT LOGIN |
| | SHERRY R | 7% | ⬇ | 3 WEEKS WITHOUT PIN OR COMMENT |
| | PETER S | 9% | ⬇ | 45% ACTIVITY DROP THIS WEEK |
| | DAVID C | 12% | ⬇ | 1 WEEK WITHOUT LOGIN |
| | RYAN S | 13% | ⬇ | 30% ACTIVITY DROP THIS WEEK |

FIG. 5B

PREDICTION AND ALERT SYSTEM TO IDENTIFY HIGHER RISK STUDENTS WITH GRADING SYSTEM IN AN ONLINE LEARNING FORUM

BACKGROUND

Teachers usually grade students based on some combination of test scores, presentations, and class participation. On a scale, these success measures range from more to less objective, respectively. Measuring class participation can prove challenging unless a teacher keeps meticulous notes about who is participating, and considering and marking an impression of the quality of such participation on each participatory occurrence.

In modern classrooms where more interaction between students happens online—in chat rooms, message, boards, or other virtual academic forums—the ability to measure the interactions objectively can be easier because the instructor has more time to evaluate content. But in a larger seminar, or an actively participating class, the burden for the evaluation increases, with a professor forced to sift through hundreds of responses.

With the challenge of grading this participation comes an added problem of identifying a student Who may be at risk. In collegiate classes where the objective test grade is done based on few tests or maybe only a final, the instructor may not realize that a student is at risk of failing until it is too late. Often a timely instructor intervention can save the at-risk student, resulting in improved student outcomes.

SUMMARY OF THE EMBODIMENTS

A system for use in preparing student grades based on participation in an online teaching forum includes an online forum usable by students where students interact within the forum by adding content to the forum, an analytics module that analyzes the added content and assigns the content a point value based on the content quality, and a grading module that calculates a grade for each student based on the point value.

BRIEF DESCRIPTION OF THE DRAWINGS

FIGS. 5A-5C show dashboards for the online forum.

DETAILED DESCRIPTION OF THE EMBODIMENTS

Modern classroom interaction frequently includes an online component. This online interaction may include online testing, ability to chat with teachers and classmates, and interactive forums. In interactive forums or chat rooms, where an instructor is not present in real time but can review the student interaction, the instructor may elect to assign grades based on student participation in this forum.

Based on participation metrics, an instructor may be able to identify a student who is struggling and intervene to help them avoid academic troubles.

The figures show a system that enables an instructor to measure participation in an online forum, to both help with grading and to identify students who may be academic jeopardy.

Figure 1:
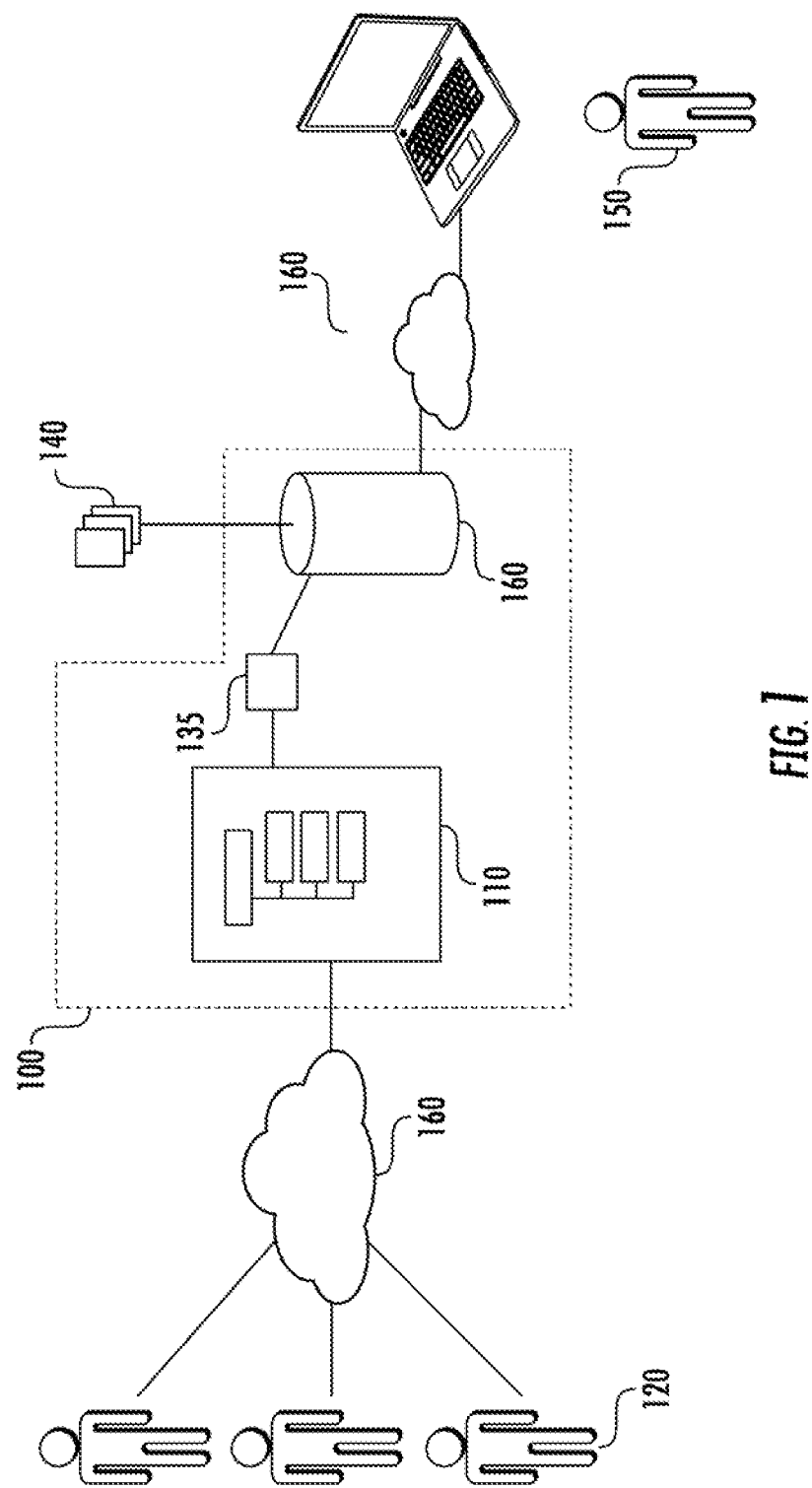
FIG. 1 shows an overview of the system users and schematic components.

FIG. 1 shows an overview of the system users and schematic components. In the figure, the system 100 includes an online forum 110, an analytics module 130, and a storage database 135. In use, students 120 access the system 100 and the online forum 110 via the interact 160. Within the online forum 110, the students post, comment, and upvote according to the online forum's structure, as discussed below.

The online forum 110 is supported and fed by a database 135 that stores information/content from the online forum 110, user login information, course-related data, and instructor 150 course settings. An analytics module 130 calculates points and may include a grading module (also called an autograding engine) 130 that calculates grades based on students' 120 participation in the online forum 110 and other data like test scores 140.

Figure 2A:
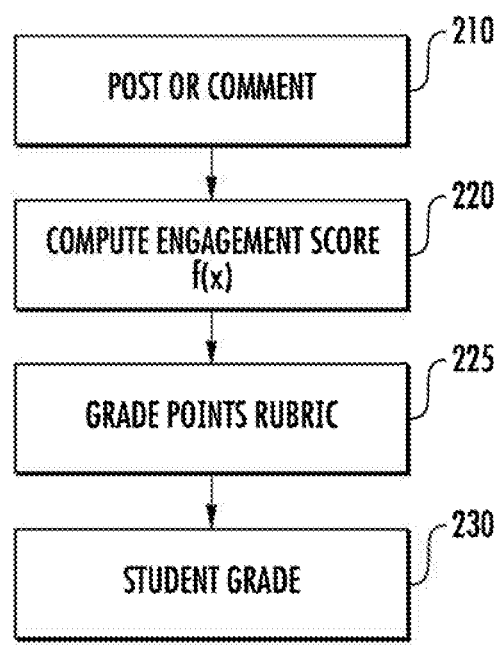
FIG. 2A shows a generic overview of the logic between a student's online participation and their grade.

FIG. 2A shows a generic overview of the logic between a student's online participation and their participation grade. Within the system 100, a student 120 creates some manner of content 210 in the form of a new post (or pin P), comment on another's post, or upvote (or received upvotes from others). After creating the content 201, the analytics module 130 computes an engagement score 220 by consulting a grade points rubric 225, and the grading module generates a grade 230.

Figure 2B:
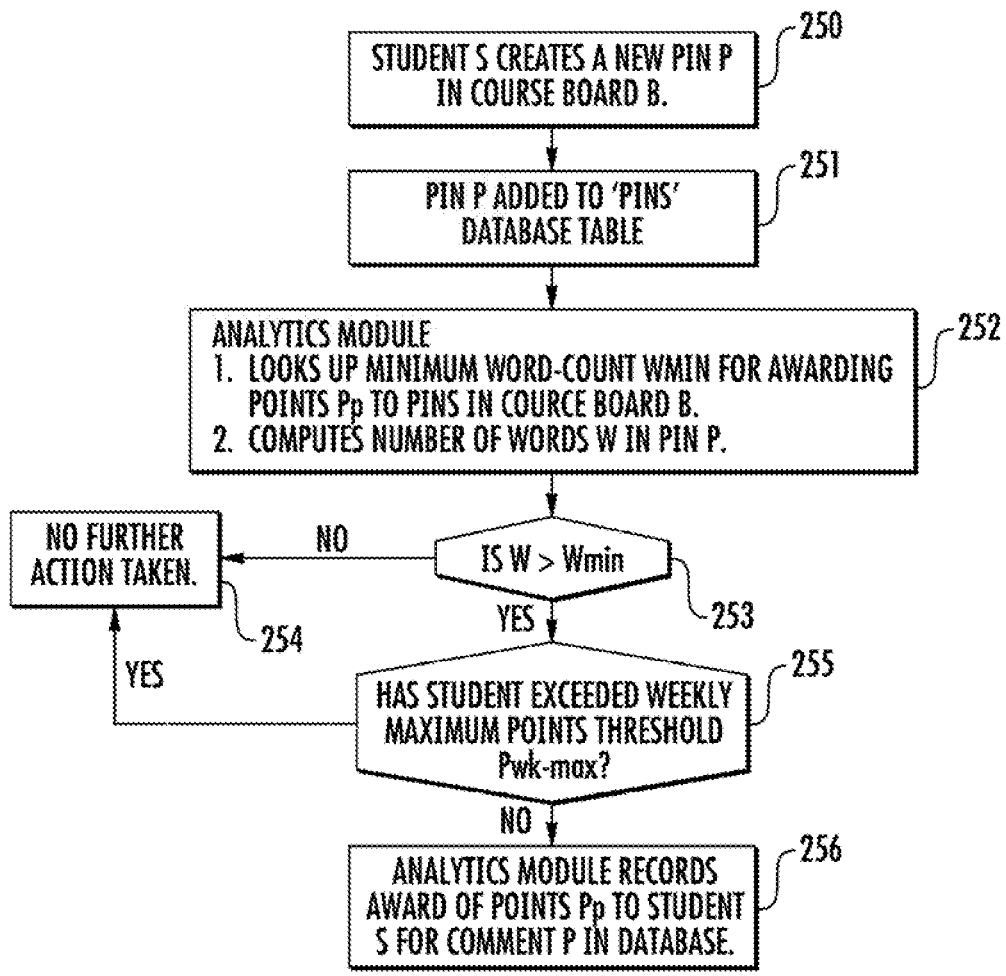
FIGS. 2B-2E show further expansions of the logic for calculating a student's grade.

FIGS. 2B-2E show further expansions of the logic for calculating a student's grade. FIG. 2B shows the logic when a student creates a new post or pin P in the offline forum or course board. As a first step after logging in and passing a credentialing step, the student creates the new post on the course board 250. The post or pin P may then be added to a database that stores posts, for the sake of this example, in a pins database 251.

The analytics module 130 may retrieve a minimum post word count post Wmin 252, which may serve as a minimum threshold for awarding any points to a student based on a post, as well as the number of points and manner of points awarded for posts. The analytics module 130 may then compute the number of words W within the post pin P 252, and compare W against Wmin 253. If W is less than Wmin, the post may not be scored as adequate 254 to receive points to apply to grading, such as a post that says, "I agree" or "OK." As will be discussed later, the instructor may set Wmin manually.

If W is greater than Wmin, the analytics module 130 may then check whether the student exceeded a threshold of points achievable for a given time period (in FIG. 2A, this threshold is a weekly threshold Pwk-max) 255. The instructor may also set the points threshold for a time period manually. The points threshold per time period prevents a student from loading up points in a single time period—students being students, often in the last 3 days of a term and instead encourages students to participate throughout a term.

If the student has exceeded their points achievable Pwk-max, the student receives no more points 254. If the student has not exceeded their points achievable, the analytics module records the points award against the student in a grading table 256 within its database 135.

Figure 2C:
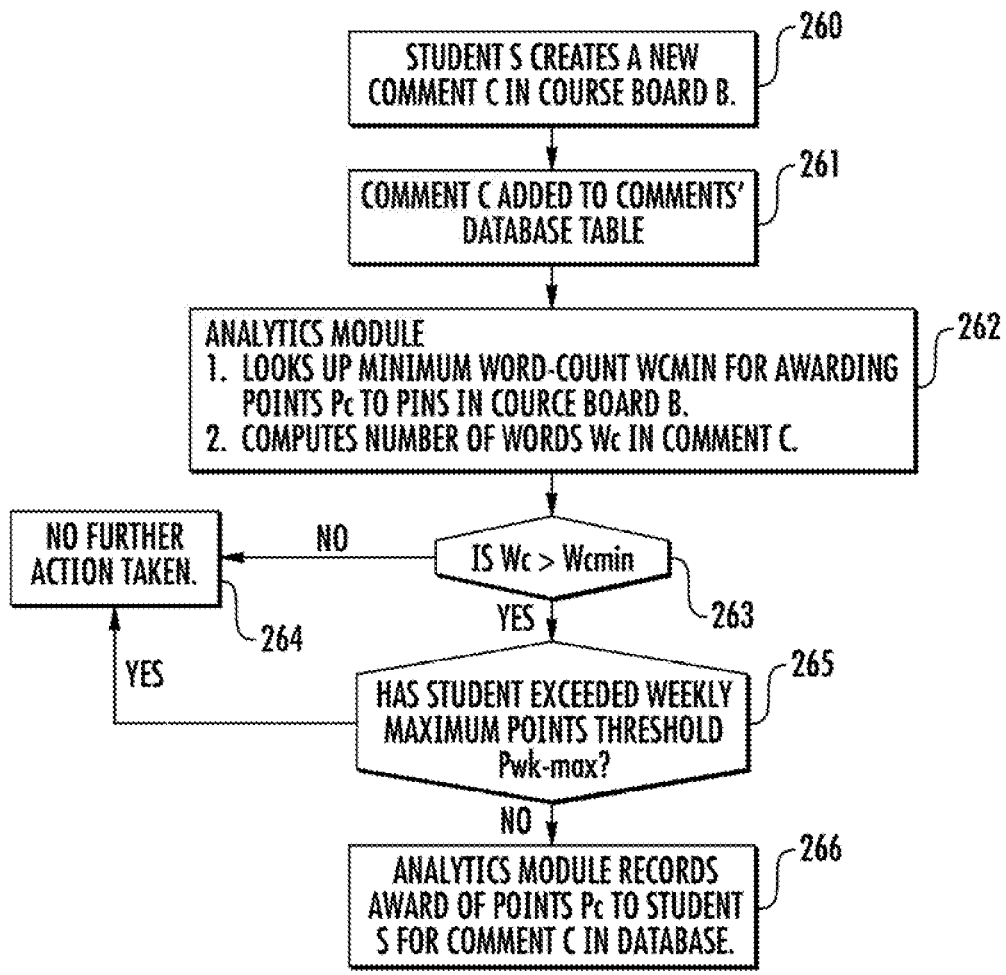

FIG. 2C shows a parallel logic that executes when a student posts a comment to the online forum 260, where a comment C is added to the comments database 261, the analytics module looks up the comments word count minimum Wcmin and counts the comment words 262, compares the comment word count with the word count minimum 263, checks the achievable per time period points 265, and awards 266 or does not award 264 points.

The relationship between the pouts and a student grade may be accessible to the students on a real-time basis. Instructors can set a minimum number of points each student should earn in a course to get the 100% grade. For example, if a student has 200 points and the minimum number of points to get 100% grade is at 400, the student will see 50% participation score in the points dashboard. A student dashboard may be updated on a real-time basis to provide students with real-time feedback on their participation. Setting minimum points for the course may encourage each student to meet a minimum participation level without discouraging anyone from exceeding the expected level.

Figure 2D:
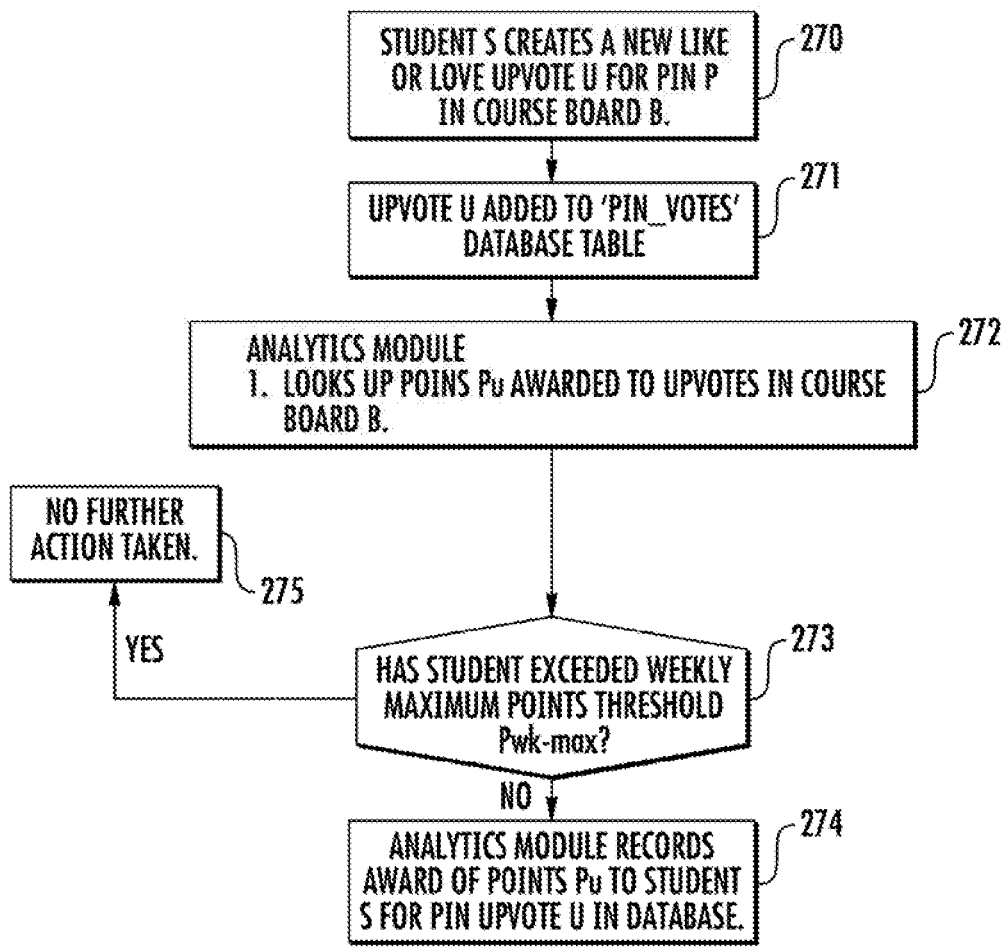
Figure 2E:
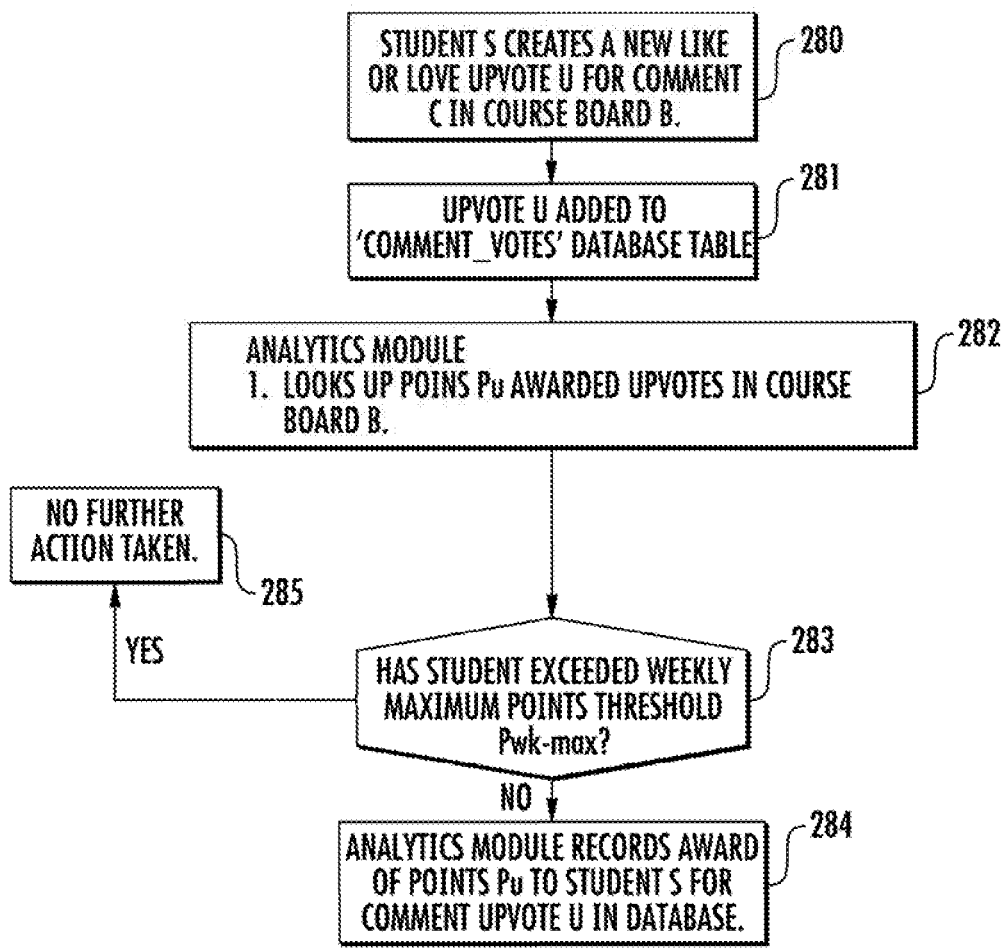

The online forum may include an ability for students and instructors to upvote, or quickly identify value in a post or comment, such as by a like or a scaled like that indicates "Love it," "like," or "not relevant." FIGS. 2D and 2E show logic flows for calculating the effect of an upvote on a student grade. The grading module 1130 may credit points for submitting and/or receiving upvotes.

A student submits an upvote on a post or comment 270, 280 and the upvote may be added to the appropriate database that stores post and comment votes 271, 281.

The analytics module may then retrieve the number of points and manner of points awarded for posts or comments 272, 282 and compares that to the achievable per period points and awards 274, 284, or does not award 275, 285 the points. The upvote logic may also include an upvote maximum points per time period check to determine whether the student is loading up on "upvote" points, or getting easy points by merely submitting clicks and not making the more substantive posts or comments.

The system 100 may assign a new content point value to addition of new content, a comment point value to addition of a comment, receipt of positive feedback on new content or a comment, a positive feedback point value to an award point value to receipt of an award.

Figure 3A:
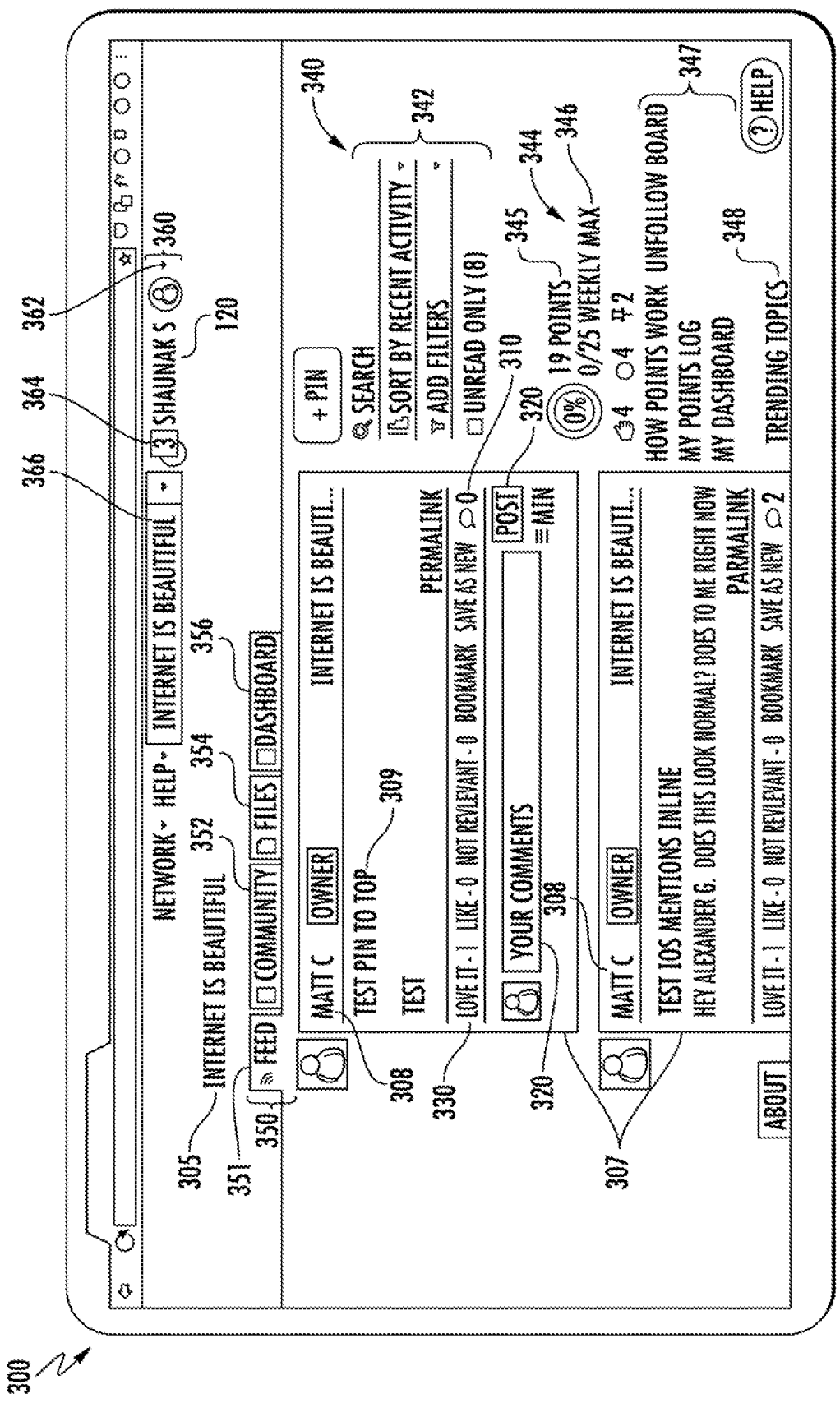
FIGS. 3A and 3B show different screen shots of a sample online forum.
Figure 3B:
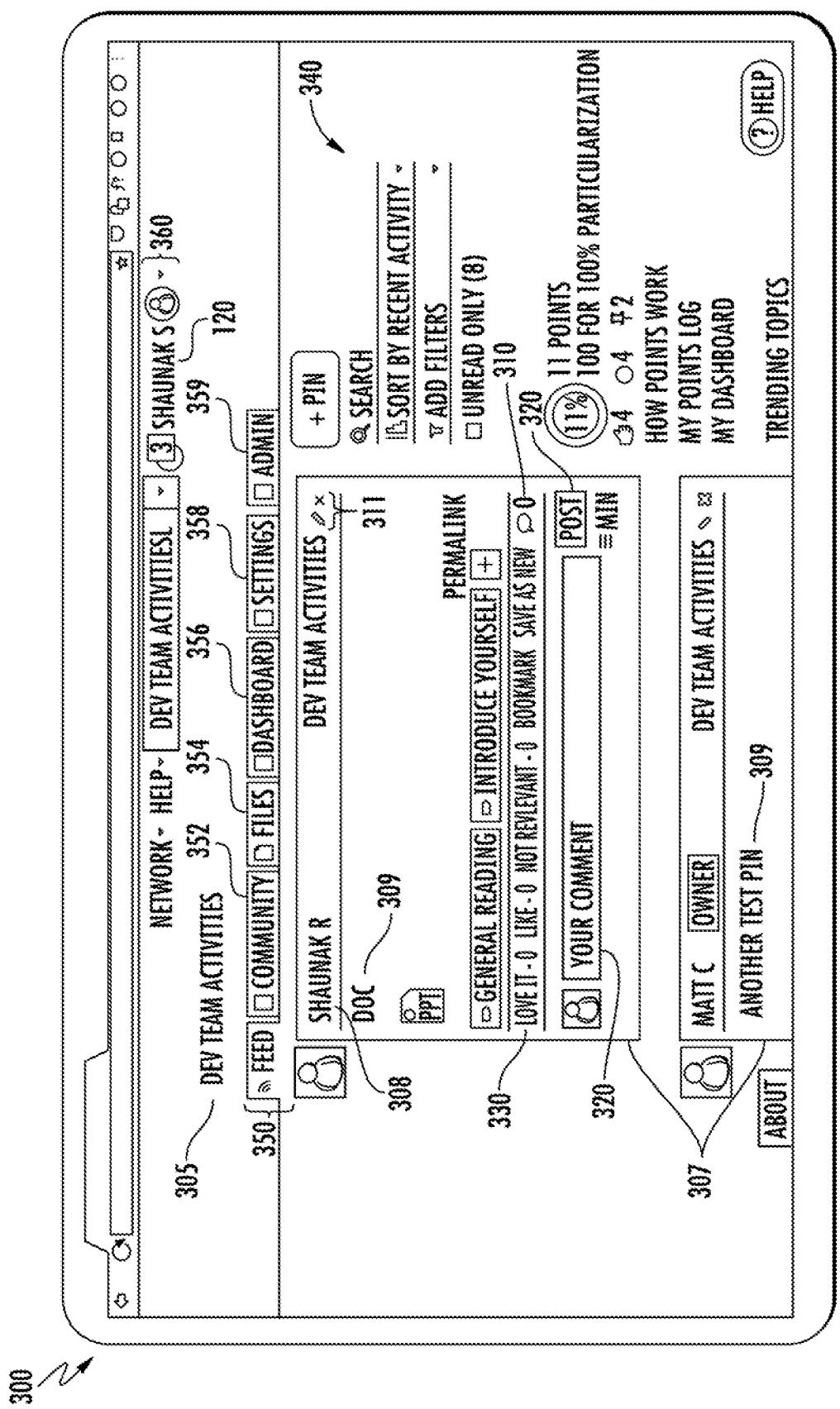

FIGS. 3A and 3B show different screen shots 300 of a sample, online forum. The screen shots 300 show a forum title 305, posts 307, comments 320, status area 340, user menu 350, and account menu 360.

The forum title 305 shows the title of the forum that the user (student view in FIG. 3A and instructor/admin view in FIG. 3B—with access to the admin tools) is engaging.

The user may select different options in the user menu 350 and FIGS. 3A and 3B show the user's view of the online form's feed. In the user menu, there are options for community 352, files, 354, dashboard, 356, and for the instructor/admin: settings 358 and admin 359.

The feed shows posts 307 that show a poster's name 308 and post title 309. The post may also include post time, and a generate permalink icon to generate a URL to the post 307.

Once posted, the post 307 may be commented on by other users through the comment box 320. When a user enters text into the box, they may complete their comment by clicking "post." Upon commenting, the comment may be immediately viewable to all members of the forum community or undergo a vetting through an administrator. Once viewable, the comment count icon 310 will advance in number count.

A post or pin upvote bar 330 is available for users to indicate their appreciation for the post. A similar comment bar may be also available to indicate appreciation of a comment. As each upvote is tallied, the corresponding counter 332 advances.

A user status area 340 shows access to view filters 342 and current period point accumulation 344 that shows points 345 towards the achievable per period maximum 346. An explanatory section 347 of the user menu 340 allows a user to see an explanation of how the points work, a points log history, a user dashboard, and an ability to unfollow the online forum. The user may also view trending topics 348, which can be helpful in busier forums.

The user status area 340 may also include a new post link 341 to begin a new post.

As can be specifically seen in the instructor/admin screen shot of FIG. 38, the instructor may have access to settings 358 and admin functions 359, as well as access to delete or edit posts and comments 311.

The user may access their account information such as password, contact information, and billing through the user menu 350 user drop down box 362. They may access messages from the instructor, other students, or the system through the messages icon 364, that may show messages in a number flag, for example "3" as shown.

If the user engages more than one online form, they may access this through the forum selection dropdown 366. As can be seen between FIGS. 3A and 38, the user switches from the forum "Internet is Beautiful" to "Dev Team Activities."

Figure 4:
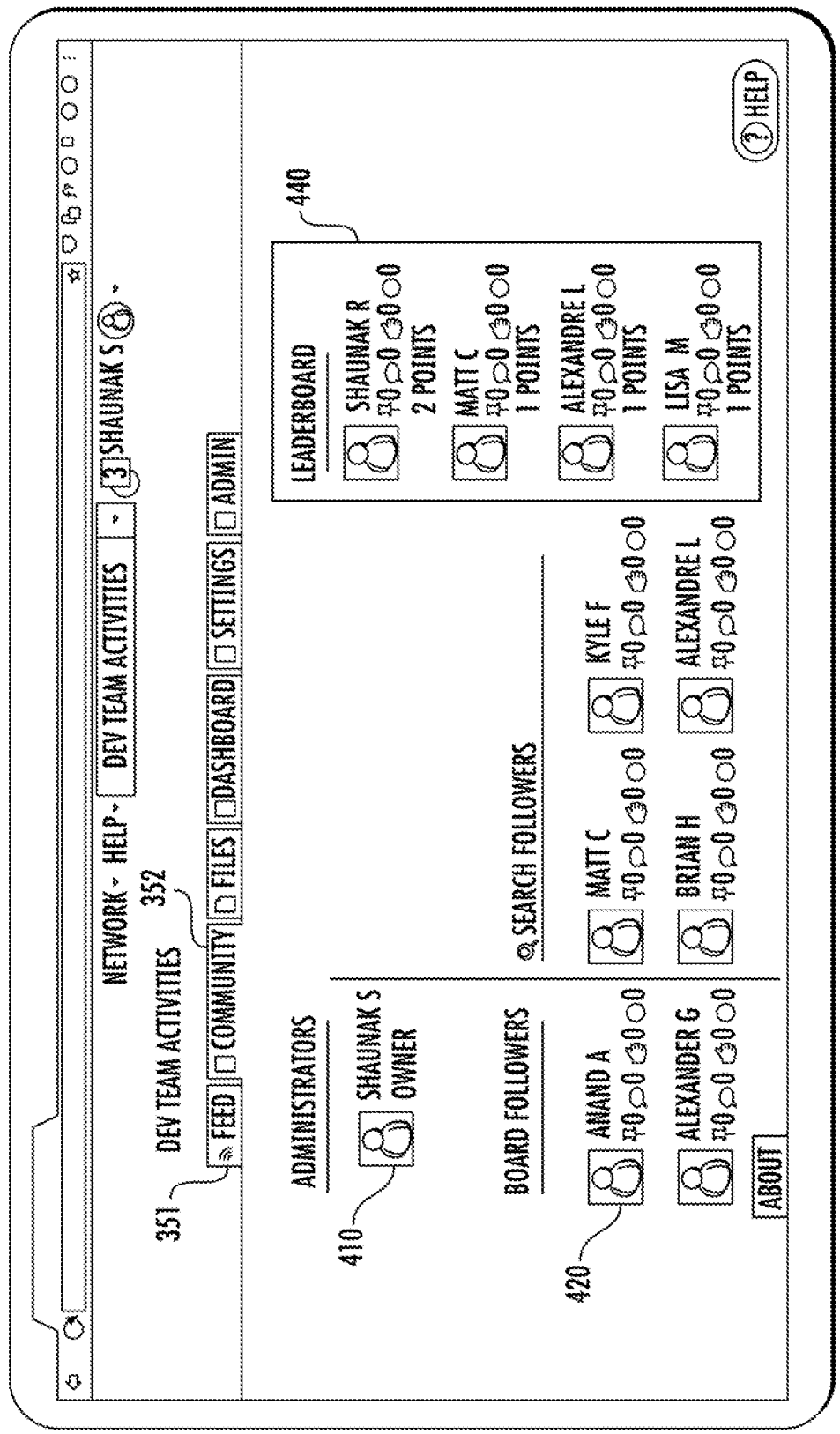
FIG. 4 shows a screen shot of the community within the online forum.

FIG. 4 shows a screen shot of the community 352 within the online forum, with a view similar to the feed 351 selected in FIGS. 3A and 38. In this view, the user may see the online forum community, including the instructor or administrator (s) 410 and followers or students 420. A leaderhoard 440 may show the points accumulated by community members.

FIGS. 5A and 58 show user dashboards for the online forum. The screenshot of FIG. 5A may be accessed by selecting the dashboard 356 in the user menu 350. This may or may not be accessible to students. When accessible, a course report feed 510 may be shown that shows points total, pins, comments, and votes organized by student. This allows an instructor to see, at a glance, how their students are performing with respect to class participation in the online forum. This data is automatically filled in based on student participation in the forum, allowing the instructor to just check this dashboard 510 occasionally.

The instructor or admin feed may also show engagement scores to indicate if there are any at-risk students, Engagement score may be calculated based on quantitative and qualitative factors.

Quantitative factors include actions such as number of logins, views, posts, comments, replies, votes, and amount of time spent on the platform over time. For example, students who log into the online forum more frequently indicate higher engagement compared to students who log in less frequently or only before an assignment is due. Students who actively participate by posting or commenting indicate higher engagement than students who only view other's posts and comments and rarely participates. Different levels of engagement can be weighted differently by the instructor or assigned based on historical trends.

Qualitative factors include analysis of student's text to predict engagement behavior, such as curiosity or originality in a post, Students who ask more questions in their post tend to indicate higher curiosity than students who ask fewer questions. Similarly, students who build on ideas on top of other's posts and comments indicate deeper engagement than those who don't.

The system may normalize student scores based on trends within and across courses to eliminate false alarms. For example, during holidays or at the beginning or end of a semester, participation in the forum may drop—and less enrolled courses may get less (or more) participation per student, Student engagement may often be measured in the context of an overall forum because normalizing the score with respect to everyone else's score in the forum for that particular week would reveal a less alarming story.

Still, variability of a student's engagement patterns across multiple courses may offer important insights into one's intrinsic behavior. For example, some students might be overly introvert or overly extrovert, which one can reasonably predict from their engagement patterns across multiple courses.

A student's normalized engagement score over a time period along with other distress signals may be used to classify students, Examples of distress signals include early exam score, class attendance, assignment completion rate etc. and include the following classifications that may be based on predetermined point values that may be determined during certain time periods:

Most Engaged: Consistently engagement over a period of time and low distress signal indicating low probability of dropout Somewhat Engaged: Mostly engaged over a period of time with a few low periods and/or some distress signal, indicating some possibility of dropout Student at Risk: Strong possibility of dropout and needs immediate intervention When a student is at risk, the instructor may see a warning on their dashboard (FIG. 5A).

Instructors and moderators can also set predefined triggers to generate a list of "At Risk" students and take corrective actions. For example, if engagement score falls by x % within y weeks, the can be notified for timely intervention. An example of an at-risk student dashboard can be seen in FIG. 5B.

Figure 5C:
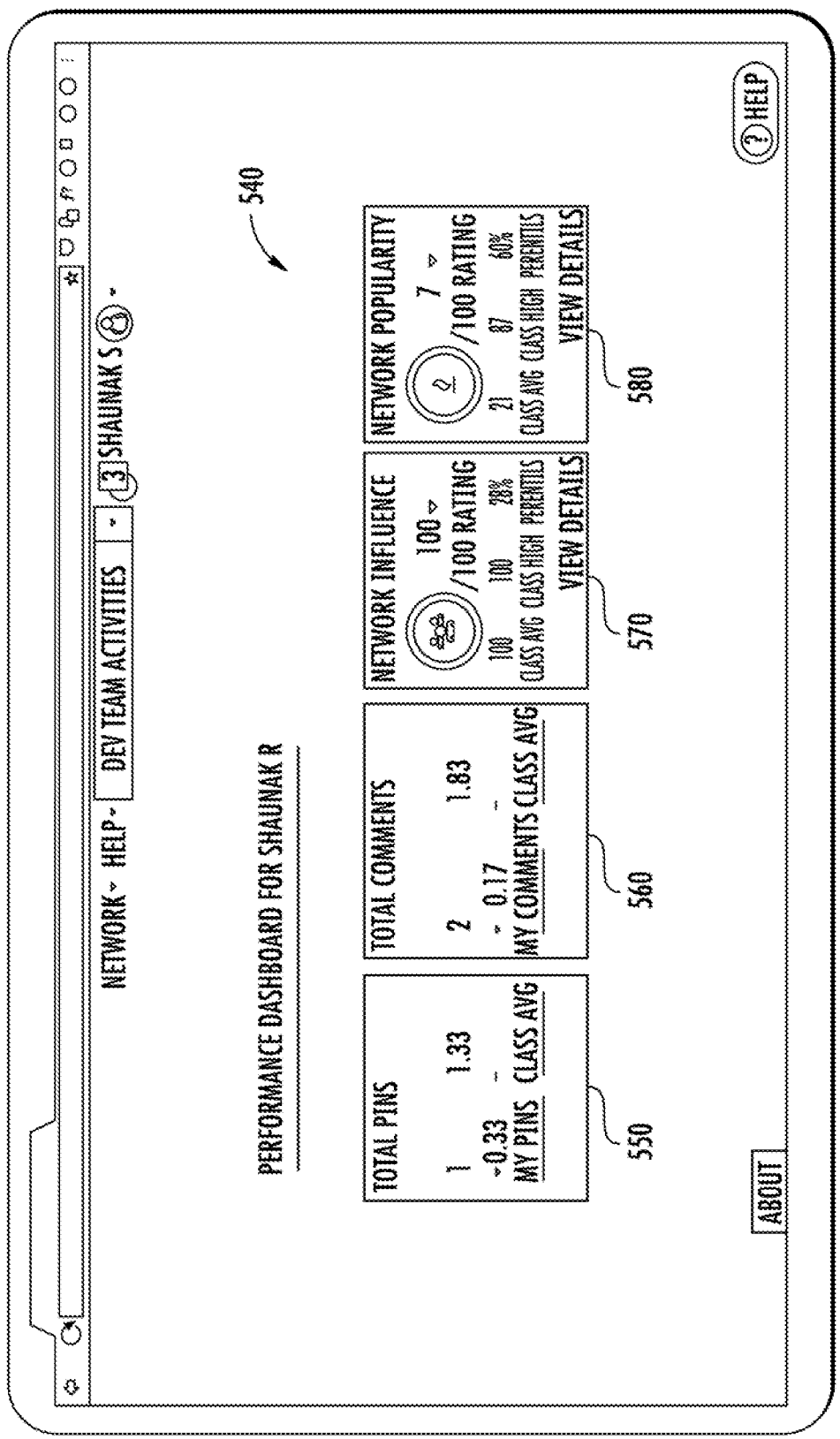

FIG. 5C shows a user's performance dashboard 540, which shows data like total pins 550, total comments 560, network influence 570, and/or network popularity 580. Total pins 550 may count total new posts (pins) compared to class average. Total comments 560 is a similar measure. Network influence 570 may show how much influence a user's posts are having and their popularity 580 measures popularity within a class.

Network Influence 570 is a rating of your outgoing interactions, ranked against the activity of other board followers. It may include the following data points. Network. Influence as calculated as a sum of Comments by you on other's pins, and Likes/Love votes by a user on other's pins and comments.

Network Popularity 580 is a rating of a user's incoming interactions, or interactions targeted to pins by other users. It is ranked against the same activity of other board followers. It includes the following data points. Network Popularity as calculated as a sum of Comments by other users on user pins, and Likes Love votes by other users on a user's Pins and comments.

The score/100 rating may be calculated using the standard deviation of all board users, A perfect 100 rating is equal to 6σ, or higher.

Figure 6A:
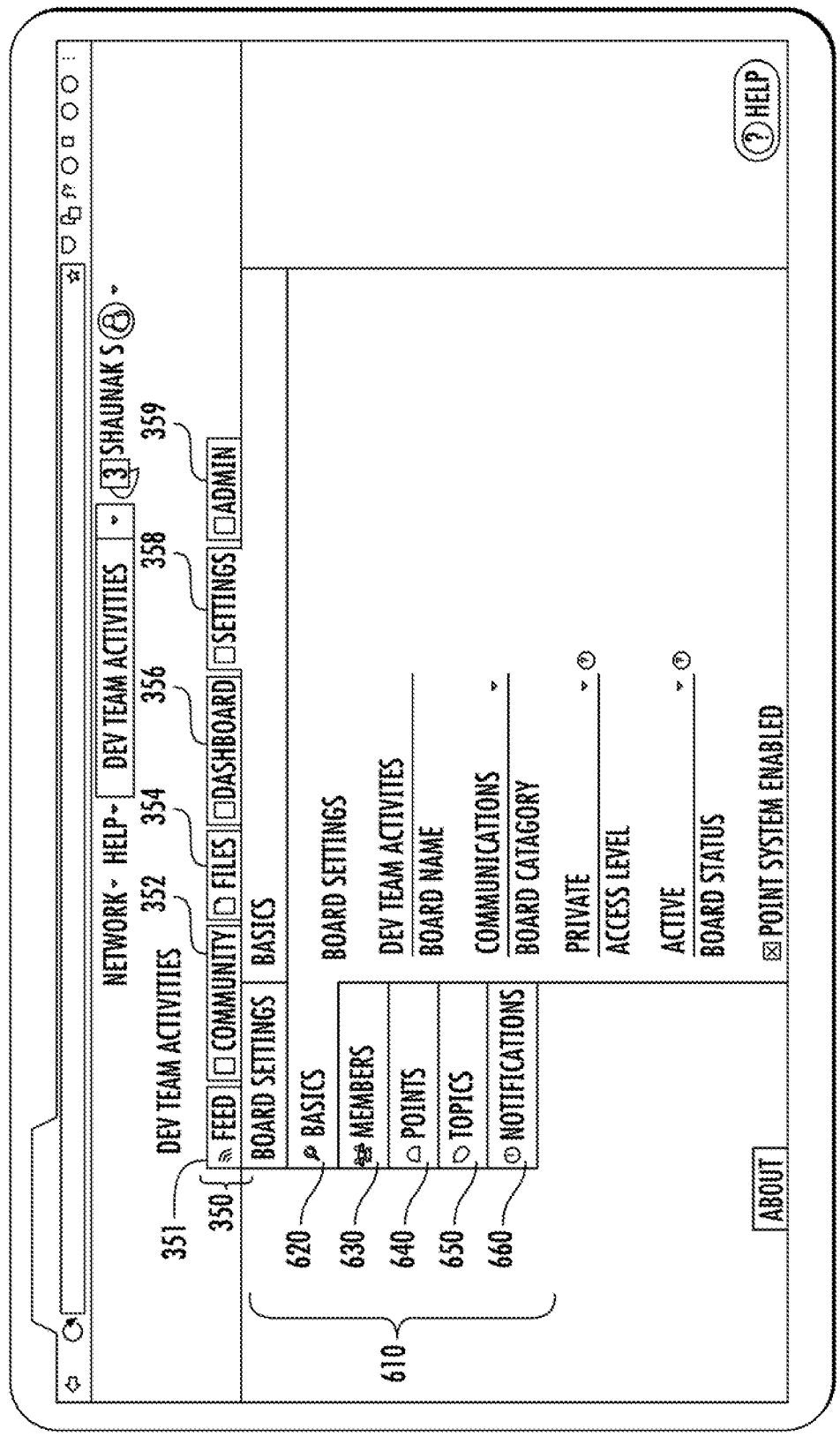
FIGS. 6A-6E show the settings that a user may set and review.
Figure 6B:
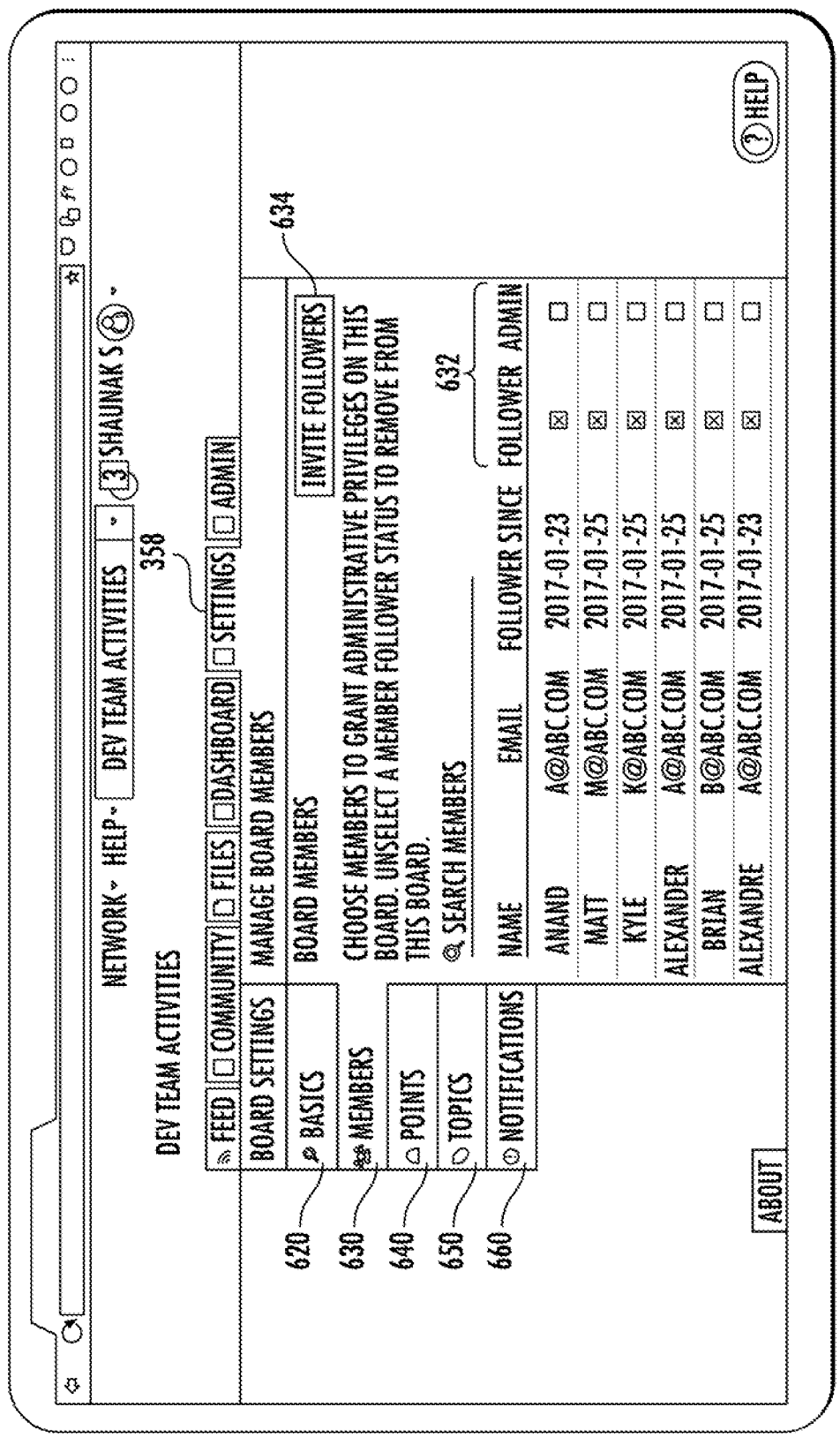

FIGS. 6A-65 show the settings that a user may set and review. When the instructor or administrator accesses the settings 358, they may set and review a settings menu 610 that includes selections for basic settings 620, members 630, points 640, topics 650, and notifications 660.

FIG. 6A shows the basic board settings 620 selected. This shows the settings for setting the board name, board category, access level, board status, and whether the point system is enabled.

FIG. 68 shows the members settings when a user selects the member settings 630. The member settings 630 allow the user to set privileges for each user to follower (for students or other non-administrative privilege participants) or admin (instructors or teaching assistants) 632. It also allows a user to invite further participants 634.

Figure 6C:
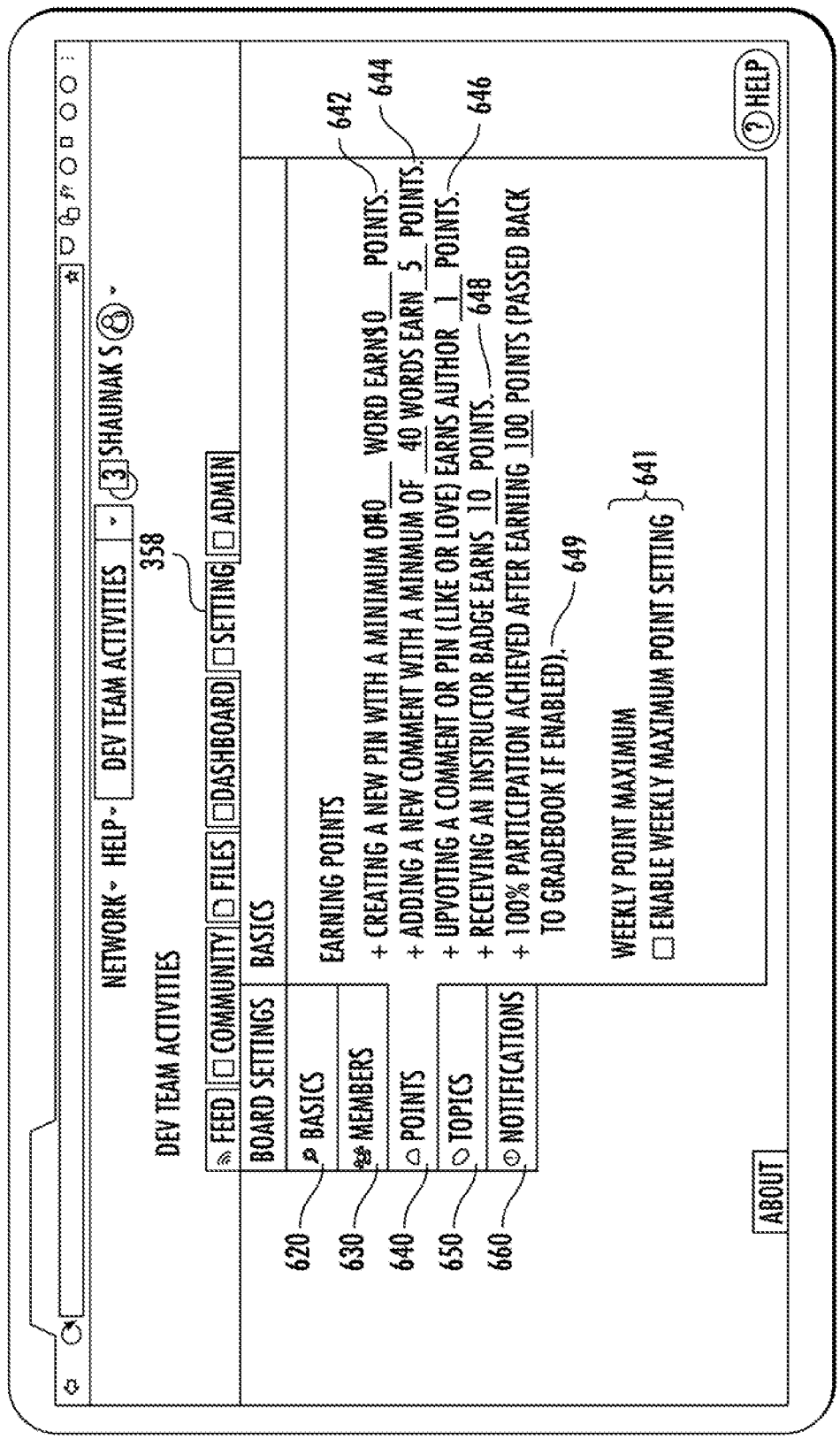

FIG. 6C shows the points selection settings 640. Within this menu, the user may set the points values for creating new posts or pins 642 as well as minimum word count, adding a new comment and word count 644, upvoting 646, receiving instructor badges or awards 648 to pins and comments that appear to be of high quality that can be awarded only by the instructor, and achievable point maximum 649. The user may also set weekly or other time period maximum thresholds 641.

Figure 6D:
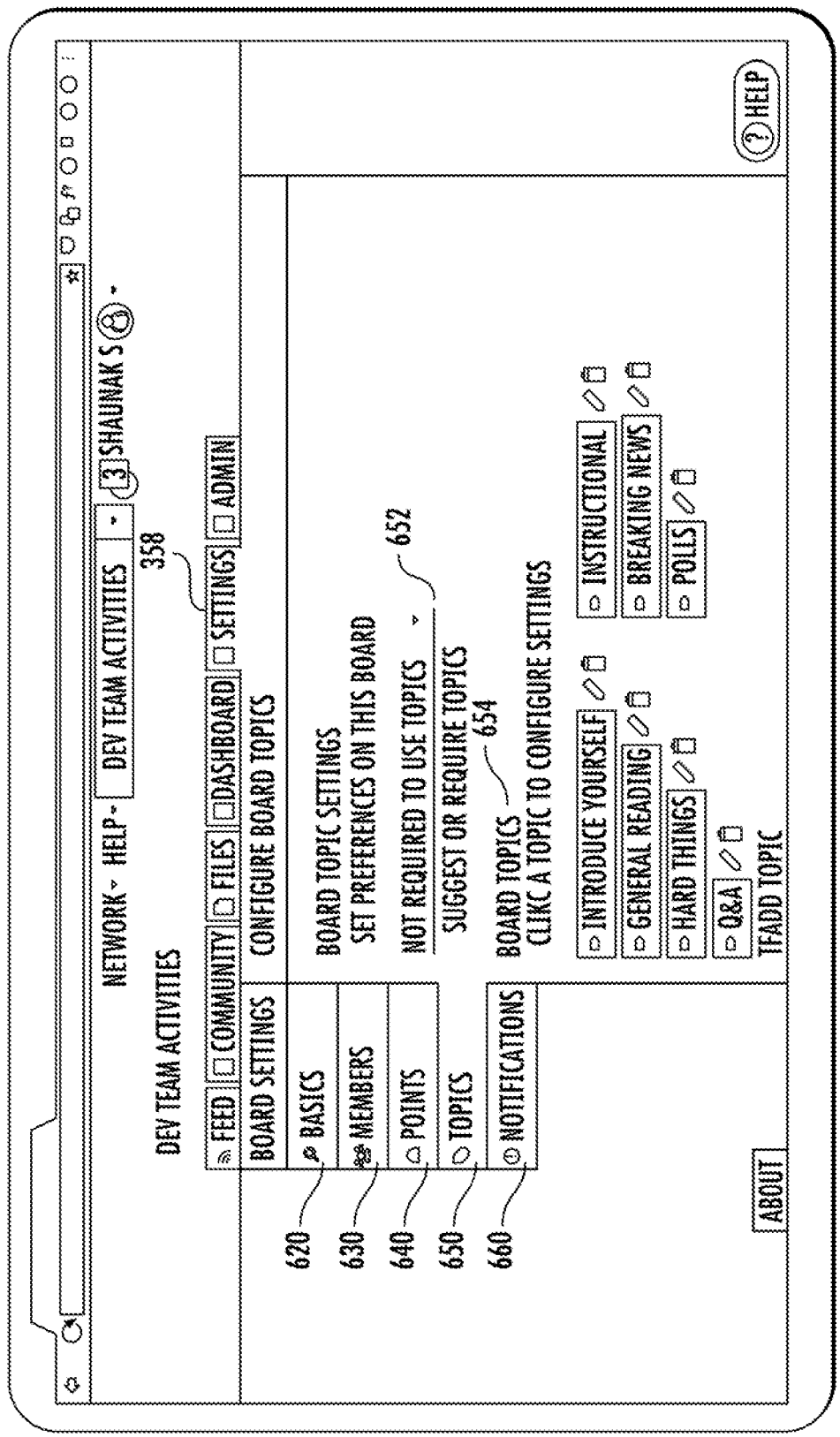

FIG. 6D shows the topic settings 650 such as whether to suggest or require topics 652, which act like tags to assist in classification of posts (FIG. 38 shows topics within a post: "General reading" and "Introduce yourself"). Topic settings 652 also allows a user to add or modify topics 654 that a user may select when making a post or comment.

Figure 6E:
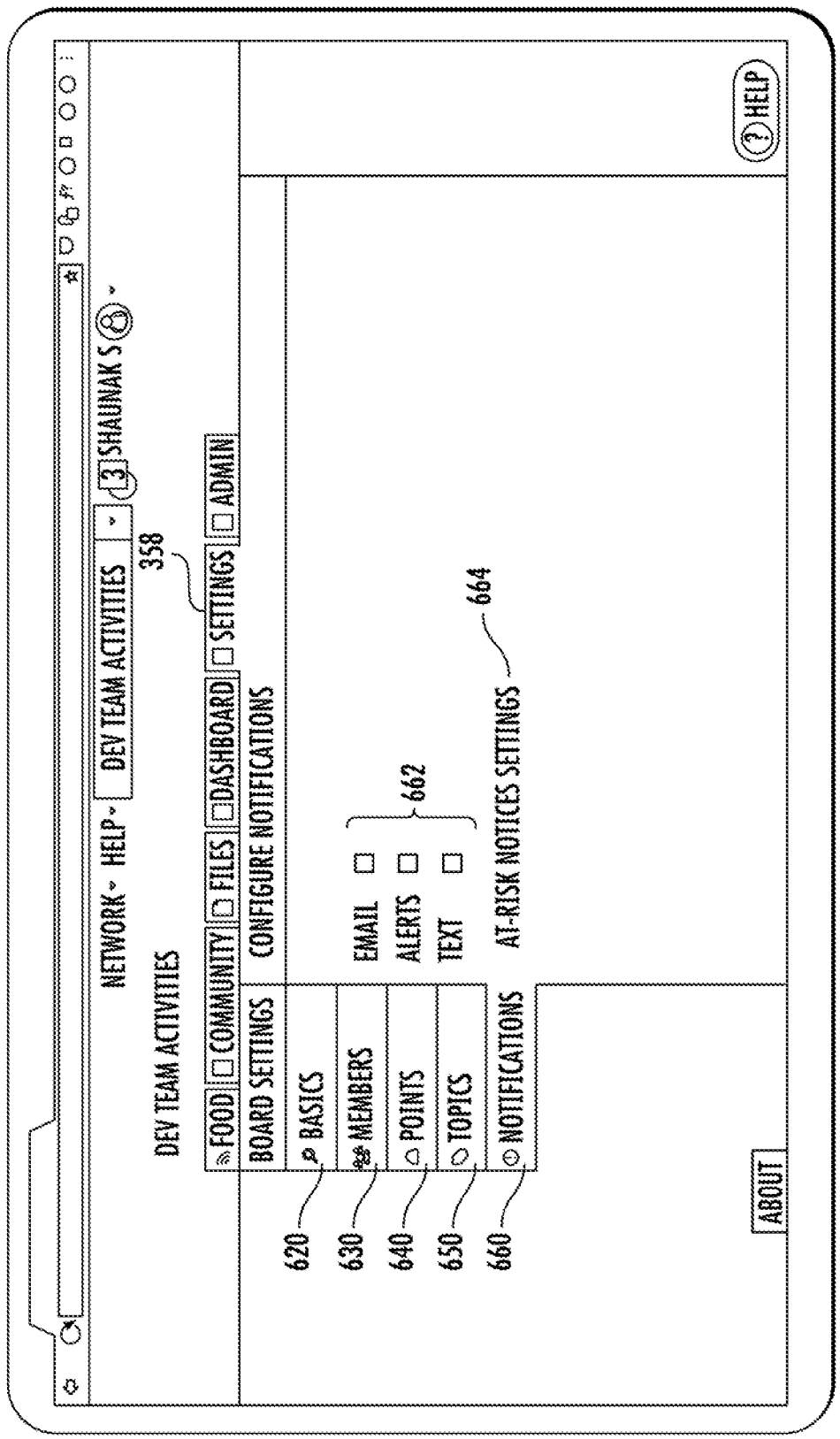

FIG. 6E shows what notifications may be configured for both students and instructors/administrators 660. These may include settings for entails, alerts, texts 662 or settings regarding notifications for at risk students 664.

The system 100 may also receive test score data 140 or other grade criteria to help an instructor 150 generate a final course grade.

While the invention has been described with reference to the embodiments above, a person of ordinary skill in the art would understand that various changes or modifications may be made thereto without departing from the scope of the claims.

The invention claimed is:

1. A system for use in preparing student grades based on participation in an online forum, the system comprising:
 the online forum usable by students via the Internet, wherein the students interact within the online forum by adding content to the online forum;
 an analytics module that:
  objectively analyzes the added content;
  objectively assigns the content a point value based on content quality, wherein the analytics module assigns the content a word count point value based on a number of words in the content, wherein adding of new content within the online forum has a new content point value, wherein adding of a comment within the online forum has a comment point value, wherein receipt of a positive feedback on the new content or the comment has a positive feedback point value, and wherein receipt of an award for at least the comment has an award point value;
  calculates an engagement score; and
  communicates a warning to an instructor when the engagement score falls below a predetermined threshold; and
 a grading module that calculates a grade for each student based on the point value, which is related to a sum of the word count point value, the new content point value, the comment point value, the positive feedback point value, and the award point value.

2. The system of claim 1, wherein adding the content comprises creating a new post.

3. The system of claim 2, wherein adding the new content comprises creating a new comment on another user's post within the online forum.

4. The system of claim 1, wherein the analytics module further reviews whether a student has received the award related to multiple posts and assignment of the point value is also dependent on the award.

5. The system of claim 1, wherein the grading module further captures data regarding student test scores.

6. The system of claim 1, wherein the grading module further weighs test scores and the point values differently in generating the grade.

7. The system of claim 1, wherein the engagement score is based on qualitative factors and quantitative factors.

8. The system of claim 7, wherein the engagement score is calculated as a sum of the qualitative factors multiplied by a sum of the quantitative factors.

9. The system of claim 7, wherein the qualitative factors are selected from a list of factors consisting of the following: logins, views, content creation, comments, replies to content or comments, feedback, and amount of time spent on platform over time.

10. The system of claim 7, wherein the quantitative factors comprise an analysis of a student's content or comment text to predict engagement behavior based on the student's content or comment's originality.

11. The system of claim 1, wherein the analytics module further tracks a student's engagement score over time, and if the student's engagement score drops by a predetermined amount from an average over time, the analytics module communicates a warning to the instructor.

12. The system of claim 1, wherein the point values are reset in every predetermined time period.

13. The system of claim 12, wherein there are multiple grades generated based on a point total per time period.

\* \* \* \* \*